United States Patent [19]
Kitahara

[11] Patent Number: 5,179,504
[45] Date of Patent: Jan. 12, 1993

[54] SHUTTER MECHANISM UNDERGOING ROTATIONAL AND TRANSLATIONAL MOVEMENTS FOR USE IN RECORDING MEDIUM AND/OR REPRODUCING APPARATUS USING CARD-LIKE MEDIUM

[75] Inventor: Toshihiro Kitahara, Tokyo, Japan

[73] Assignee: Olympus Optical Co., Ltd., Tokyo, Japan

[21] Appl. No.: 664,667

[22] Filed: Mar. 5, 1991

[30] Foreign Application Priority Data

Nov. 22, 1990 [JP] Japan ............................. 2-121833[U]
Dec. 28, 1990 [JP] Japan ............................. 2-406614[U]

[51] Int. Cl.$^5$ .......................... H05K 7/00; H02B 1/14; H01R 13/447
[52] U.S. Cl. .................................. 361/395; 361/345; 439/137; 235/475; 360/99.01
[58] Field of Search ............... 439/135, 136, 137, 138, 439/139; 235/475, 480, 483; 361/344, 345, 395, 399; 360/99.01, 99.02, 99.03, 99.04, 99.05

[56] References Cited

U.S. PATENT DOCUMENTS

| | | | |
|---|---|---|---|
| 4,857,005 | 8/1989 | Kikuchi et al. | 439/137 X |
| 4,889,498 | 12/1989 | Mizuta | 439/137 X |
| 4,933,540 | 6/1990 | Omori et al. | 439/137 X |
| 5,065,004 | 11/1991 | Mizuno et al. | 235/483 X |

FOREIGN PATENT DOCUMENTS

| | | | |
|---|---|---|---|
| 1137232 | 9/1962 | Fed. Rep. of Germany | 360/99.02 |
| 2209633 | 5/1989 | United Kingdom | 439/137 |

Primary Examiner—Leo P. Picard
Assistant Examiner—Michael W. Phillips
Attorney, Agent, or Firm—Stevens, Davis, Miller & Mosher

[57] ABSTRACT

A shutter mechanism for use in a recording and/or reproducing apparatus having a guide slot through which a record card is inserted/discharged. The mechanism includes a shutter blade arranged behind the guide slot, shafts secured to side walls of the blade, and contact members, with inclined surfaces, disposed on the rear surface of the blade. The shafts are inserted into U-shaped recesses formed in supporting members so as to move rotatably and up and down. A first coiled spring biases the blade to rotate to close the guide slot, and second and third coiled springs press the blade downward to close the guide slot. During insertion of the card, the blade is pushed by the front edge of the card to rotate the blade about the shafts against the force of the first spring to open the guide slot. After full insertion of the card, the blade is returned to an upright position to close the guide slot. During discharge of the card, the rear edge of the card is urged against the inclined surfaces of the contact members to generate a force for moving the blade upward against the force of the second and third springs. After discharge of the card, the blade is moved downward by the force of the second and third springs. The contact members are secured to the rear surface of the blade rotatably in an opposite direction in which the blade is rotated by the card during insertion.

21 Claims, 13 Drawing Sheets

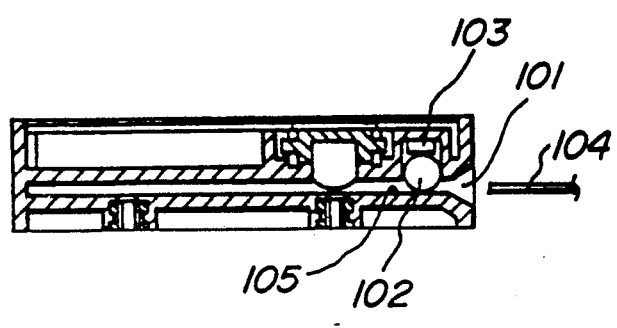
FIG_1
PRIOR ART
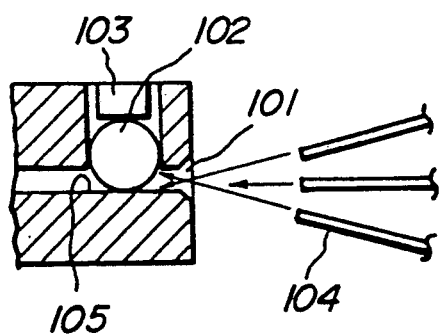
FIG_2A
PRIOR ART
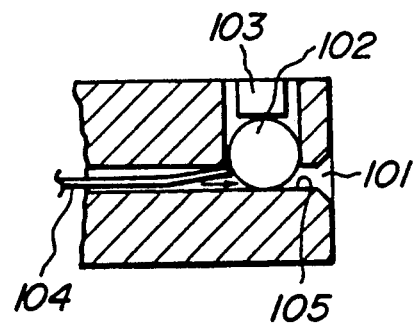
FIG_2B
PRIOR ART

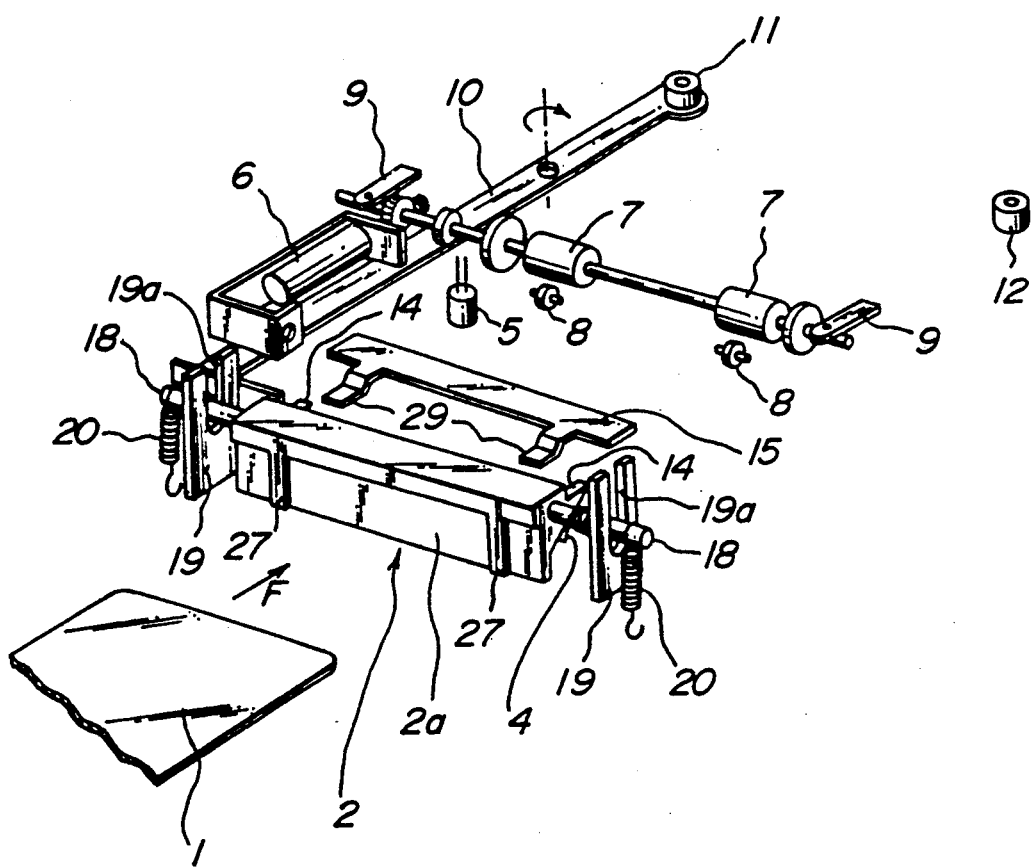
FIG_4

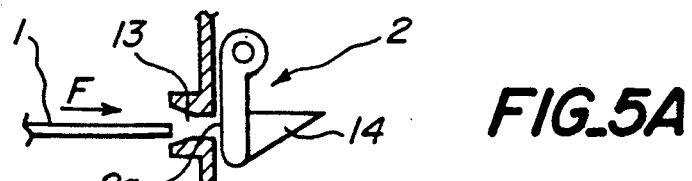
*FIG_5A*
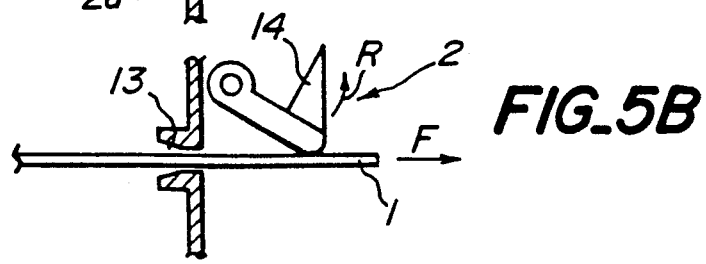
*FIG_5B*
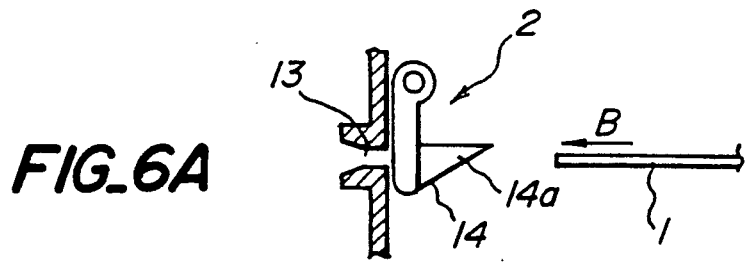
*FIG_6A*
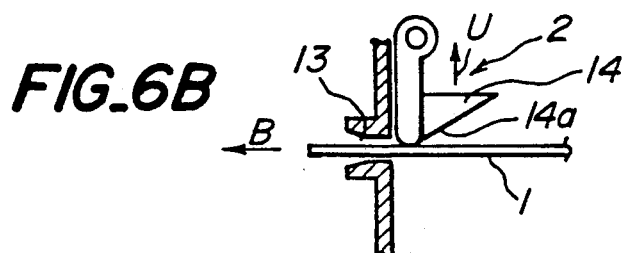
*FIG_6B*
*FIG_7*
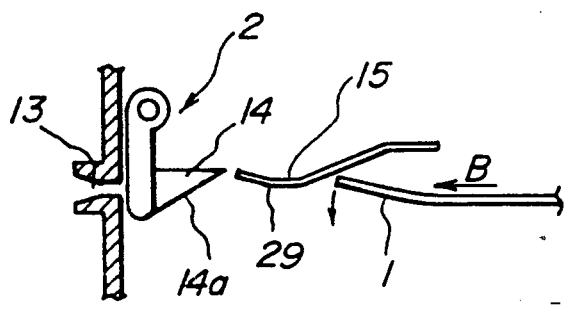

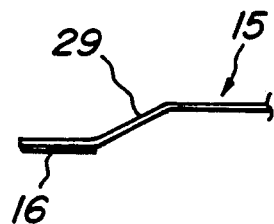
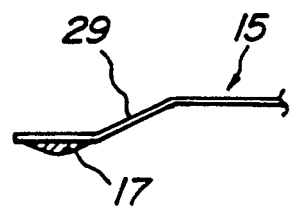
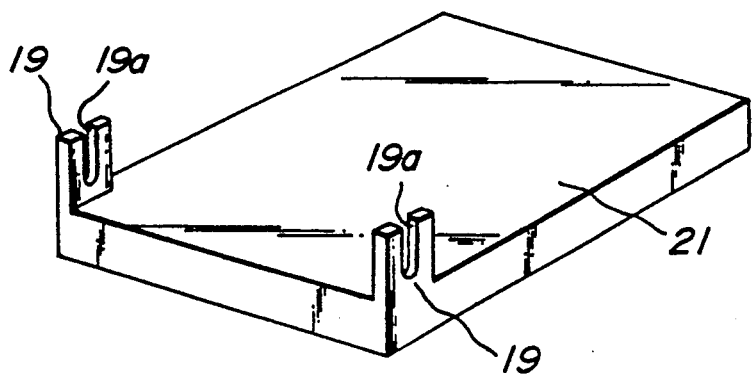
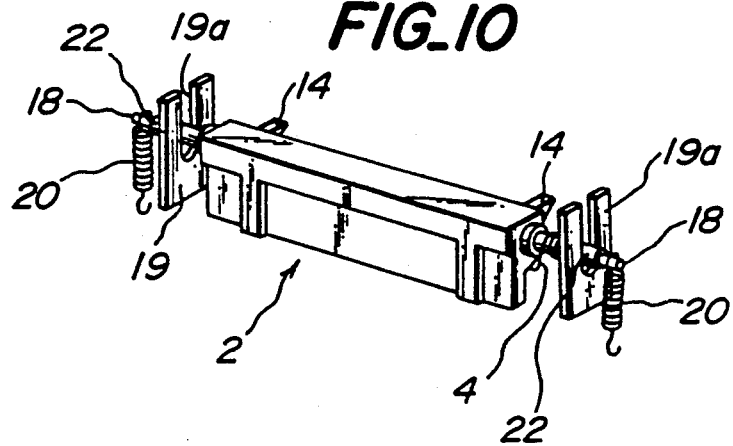

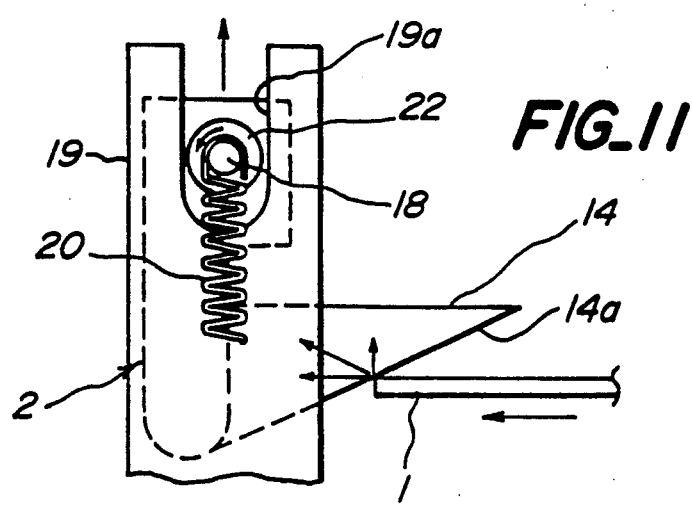
FIG_11
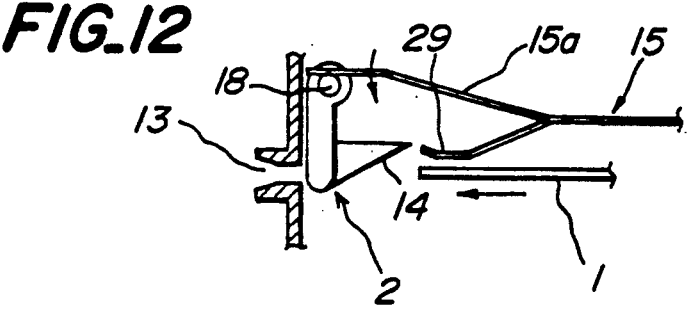
FIG_12
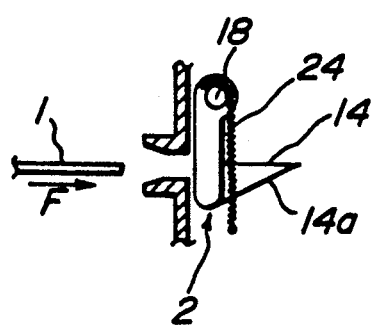
FIG_13A
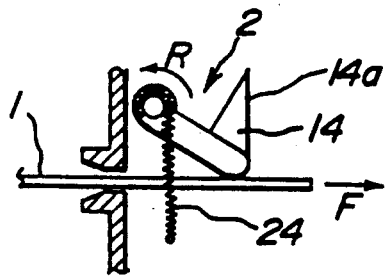
FIG_13B

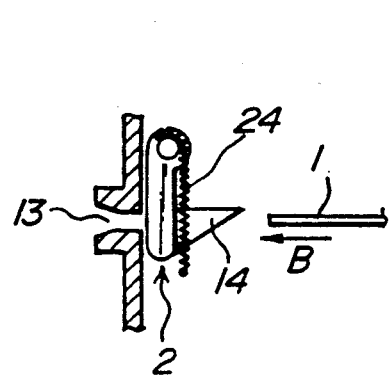
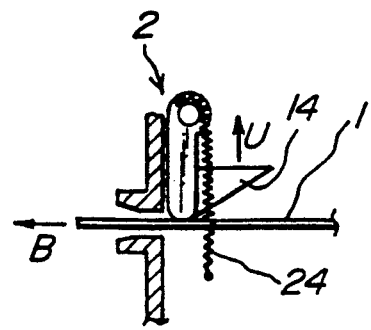
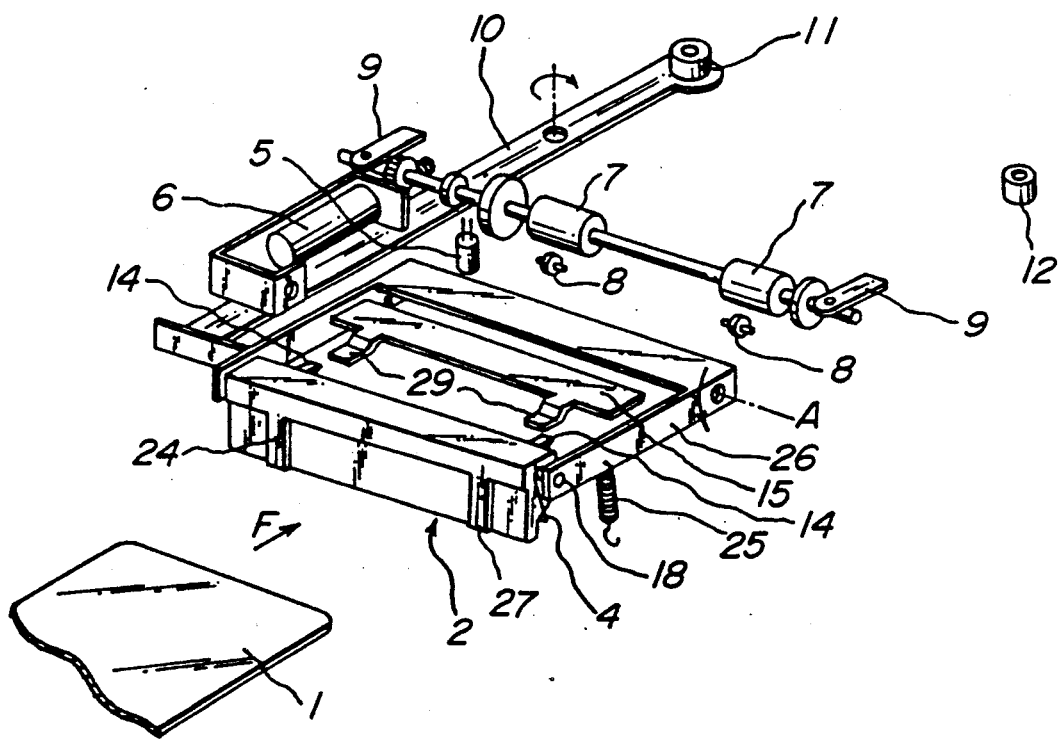

FIG_16
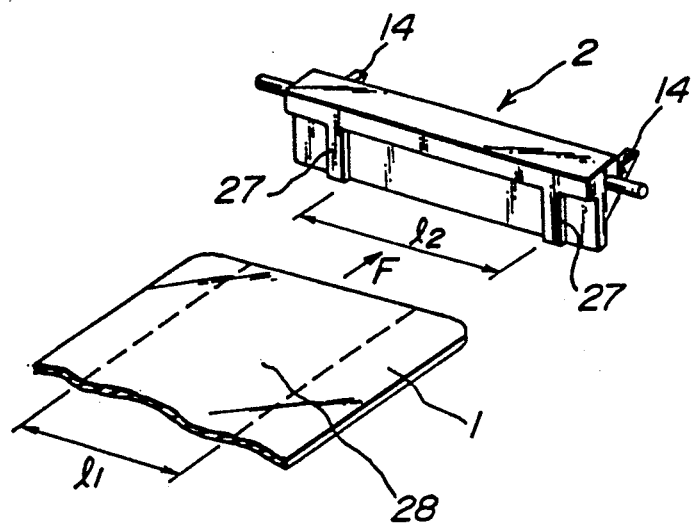
FIG_17
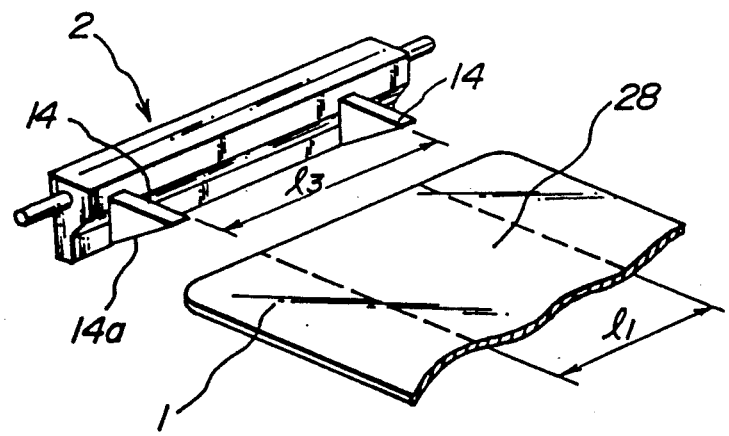

FIG_18
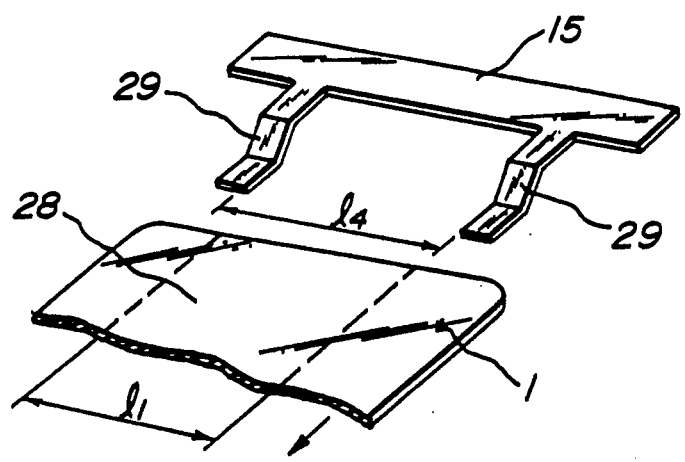

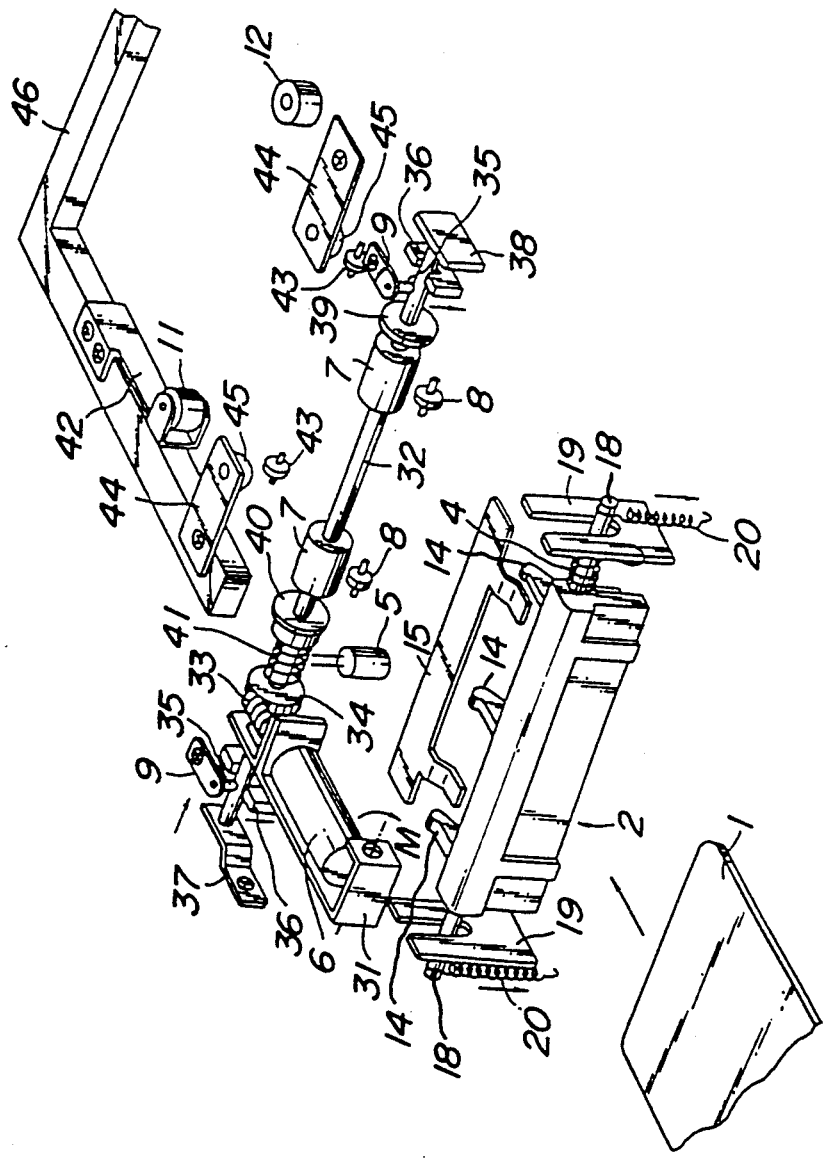
FIG_19

FIG_20
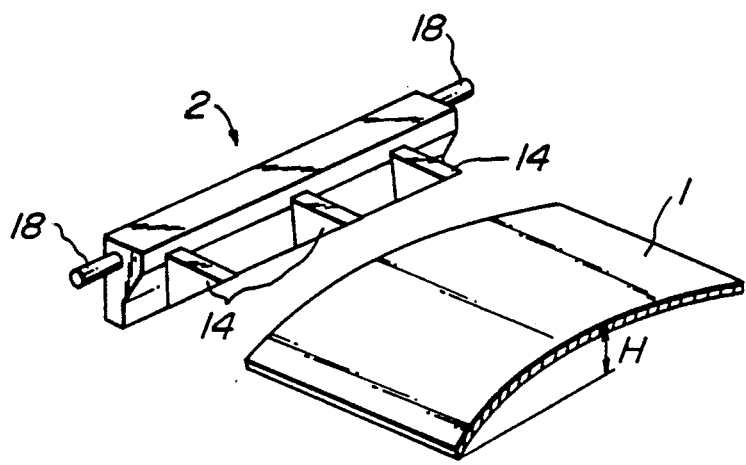
FIG_21
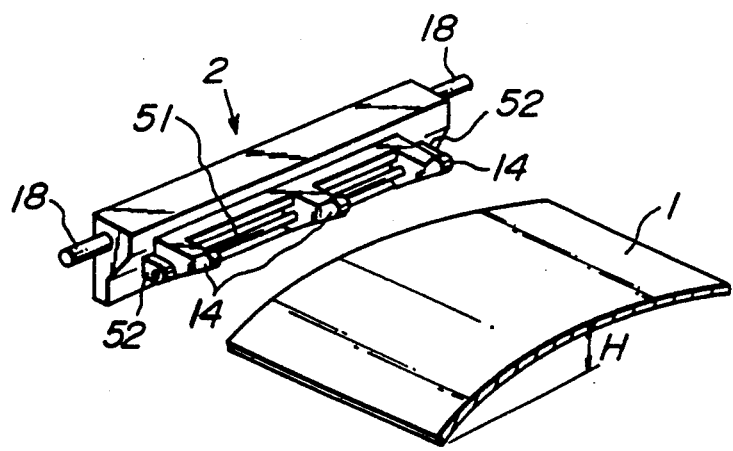

FIG_24
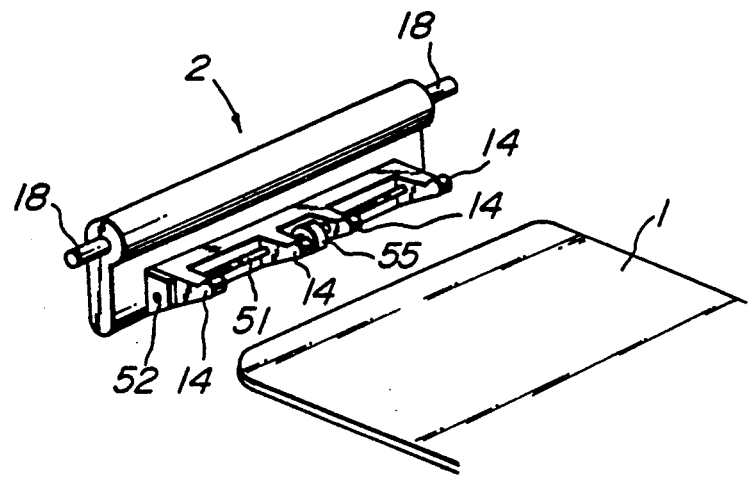
FIG_25
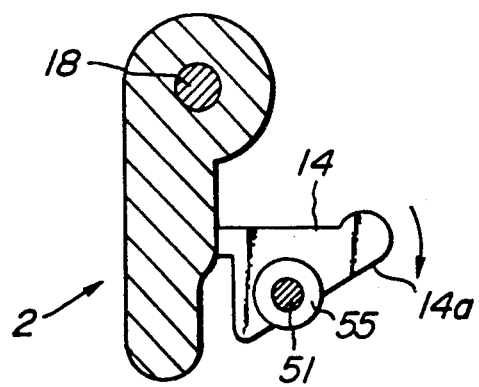

SHUTTER MECHANISM UNDERGOING ROTATIONAL AND TRANSLATIONAL MOVEMENTS FOR USE IN RECORDING MEDIUM AND/OR REPRODUCING APPARATUS USING CARD-LIKE MEDIUM

BACKGROUND OF THE INVENTION

Field of the Invention and Related Art Statement

The present invention relates to a shutter mechanism for use in a recording and/or reproducing apparatus using a card-like record medium such as a magnetic card and optical card. In the present specification, for the sake of simplicity, the above mentioned recording and/or reproducing apparatus is sometimes called a card recording and/or reproducing apparatus, and the card-like record medium is called a record card.

In the card recording and/or reproducing apparatus, there is provided a guide slot in a front wall of the apparatus and through said guide slot a record card is inserted into the apparatus and discharged from the apparatus. A movable shutter is provided at the guide slot in order to prevent dust particles from being introduced into the apparatus.

FIG. 1 shows a known shutter mechanism disclosed in Japanese Patent Application Laid-open Publication Kokai Sho 62-124,687. In this known shutter mechanism, a guide slot 101 is provided at a front wall of a card recording and/or reproducing apparatus and a rod 102 serving as a shutter is arranged within the guide slot 101 such that the rod is resiliently urged by a leaf spring 103 against a lower wall 105 along which a record card 104 is fed. As illustrated in FIG. 2A, when the record card 104 is inserted into the apparatus through the guide slot 101, the rod 102 is engaged with a front end of the record card 104 and is pushed upward against the force of the leaf spring 103. The card recording and/or reproducing apparatus comprises a card feeding device such as a driving roller mechanism and the record card is fed forwardly. When the record card 104 is discharged from the apparatus by feeding the record card backwardly by means of the card feeding device, a rear end of the record card is engaged with the rod 102 and the rod is pushed upward.

In the above mentioned known shutter mechanism, upon inserting the record card 104 into the apparatus, after the front end of the record card has been urged against the rod 102, the record card has to be pushed forward by a relatively strong force such that the rod is moved upward against the force of the leaf spring 103. In this case, the insertion angle, insertion speed, insertion force and other factors might vary for each respective inserting operations as well as users, so that there might be produced a large repelling force in the record card 104 and the record card might be bent or curved. When the record card 104 is curved, the rear end of the record card might be urged against the rod 102 at its relatively upper portion as illustrated in FIG. 2B, and thus the rod could not be pushed upward effectively. In this manner, the record card 104 might not be discharged from the card recording and/or reproducing apparatus.

In Japanese Patent Application Laid-open Publication Kokai Sho 60-247,881, there is described another known shutter mechanism. As shown in FIGS. 3A, 3B and 3C, behind a guide slot 111 there is arranged a shutter 112 swingably about a shaft 113 both forwardly and backwardly. There is further provided a spring 114 for keeping the shutter in the upright position shown in FIG. 3A. Upon inserting a record card 115 into the apparatus, a front edge of the record card 115 is engaged with a front surface of the shutter 112, so that the shutter is rotated in the counter-clockwise direction as illustrated in FIG. 3B and the record card is fed by means of a pair of feeding rollers 116 forwardly. When the record card 115 is discharged from the apparatus, a rear edge of the record card is engaged with a rear surface of the shutter and the shutter 112 is rotated in the clockwise direction. This known shutter mechanism has a drawback that it is necessary to provide a relatively large space behind the guide slot 111, because the shutter is swung both in the clockwise and counter-clockwise directions. Moreover, the shutter 112 has to be separated from the guide slot 111 in the normal position, the guide slot could not be effectively closed by the shutter, so that dust might be introduced into the apparatus. The above mentioned drawbacks may be removed by providing an electromagnetic actuator for moving the shutter, but in this case the cost of the shutter mechanism might be increased.

SUMMARY OF THE INVENTION

The present invention has for its object to provide a novel and useful shutter mechanism, in which the above mentioned drawbacks of the known shutter mechanisms can be removed and the record card can be stably and smoothly inserted into and discharged from the card recording and/or reproducing apparatus without providing the expensive electromagnetic actuator.

It is another object of the invention to provide a shutter mechanism for use in the card recording and/or reproducing apparatus, in which a record card can be positively discharged from the apparatus even if the record card is deformed or curved.

According to the invention, in order to achieve the above mentioned objects, a shutter mechanism for use in a recording and/or reproducing apparatus using a card-like record medium comprises:

a shutter blade arranged behind a guide slot formed in the apparatus, the card-like record medium being inserted into and discharged from the apparatus through said guide slot;

contact means arranged on a rear surface of the shutter blade and having at least one inclined contact surface against which a rear edge of the card-like record medium is urged when the card-like record medium is discharged from the apparatus to produce a force for moving the shutter blade upward to open the guide slot;

first and second shafts each arranged at respective sides of the shutter blade;

supporting means for supporting said first and second shafts rotatably as well as movably substantially up and down; and biasing means for resiliently rotating said first and second shafts in such a direction that the guide slot is closed by the shutter blade and for resiliently moving the shutter blade downward to close the guide slot by the shutter.

In the shutter mechanism according to the present invention, when the card-like record medium is inserted into the apparatus, the shutter blade is rotated about the first and second shafts to open the guide slot by pushing the front surface of the shutter blade against the resilient force of the biasing means, and when the card-like record medium is discharged from the apparatus, the rear edge of the card-like record medium is urged against the inclined surface of the contact means to move the shutter blade upward against the biasing means to open the guide slot. In this manner, the shutter blade can be removed out of the guide slot smoothly and positively, and even if the card-like record medium is deformed or curved, it can be inserted into and discharged from the apparatus easily. Further, when the card-like record medium is discharged out of the apparatus, it is not necessary to rotate the shutter blade in the backward direction, but it is sufficient to move the shutter blade upward. Hence, a large space is not required, so that the whole construction of the shutter mechanism can be made small.

In a preferable embodiment of the shutter mechanism according to the invention, there are provided three contact members on the rear surface of the shutter blade such that two of them are situated at opposite side portions and the remaining contact member situated at a central portion. When the card-like record medium having a rear edge curved upwardly is discharged, a center portion of the rear edge is first made to contact the contact member at the central portion to produce the force for moving the shutter blade upward.

In another preferable embodiment of the shutter mechanism according to the invention, the contact members are secured to the rear surface of the shutter blade rotatably in an opposite direction to that in which the shutter blade is rotated when the card-like record medium is inserted into the apparatus. In this embodiment, when the contact members are urged against a stationary member of the apparatus during the rotation of the shutter blade, the contact members are rotated, so that a height of the apparatus may be reduced.

BRIEF DESCRIPTION OF THE DRAWINGS

FIG. 1 is a cross sectional view showing a known shutter mechanism;

FIGS. 2A and 2B are cross sectional views illustrating the operation of the known shutter mechanism shown in FIG. 1;

FIG. 4 is a perspective view showing a first embodiment of the shutter mechanism according to the present invention;

FIGS. 5A and 5B are schematic side views for explaining the card inserting operation of the shutter mechanism of FIG. 4;

FIGS. 6A and 6B are schematic side views showing the card discharging operation in the shutter mechanism of FIG. 4;

FIG. 7 is a schematic side view illustrating the discharging operation of a deformed card in the shutter mechanism of FIG. 4;

FIGS. 8A and 8B are side views showing modifications of the guide member;

FIG. 9 is a perspective view illustrating a modification of the supporting member;

FIG. 10 is a perspective view depicting a main portion of a second embodiment of the shutter mechanism according to the invention;

FIG. 11 is a side view of FIG. 10;

FIG. 12 is a side view showing a main portion of a third embodiment of the shutter mechanism according to the invention;

FIGS. 13A, 13B, 14A and 14B are side views illustrating a main portion of a fourth embodiment of the shutter mechanism according to the invention;

FIG. 15 is a perspective view depicting a fifth embodiment of the shutter mechanism according to the invention;

FIGS. 16, 17 and 18 are perspective views representing the relation of the size between the record card and various parts of the shutter mechanism according to the invention;

FIG. 19 is a perspective view showing a sixth embodiment of the shutter mechanism according to the invention;

FIG. 20 is a perspective view illustrating the contact members of FIG. 19;

FIG. 21 is a perspective view depicting the contact members of a seventh embodiment of the shutter mechanism according to the invention;

FIG. 24 is a perspective view illustrating the contact members of an eighth embodiment of the shutter mechanism according to the invention; and FIG. 25 is a cross sectional view of the contact member.

DESCRIPTION OF THE PREFERRED EMBODIMENTS

Figure 3A:
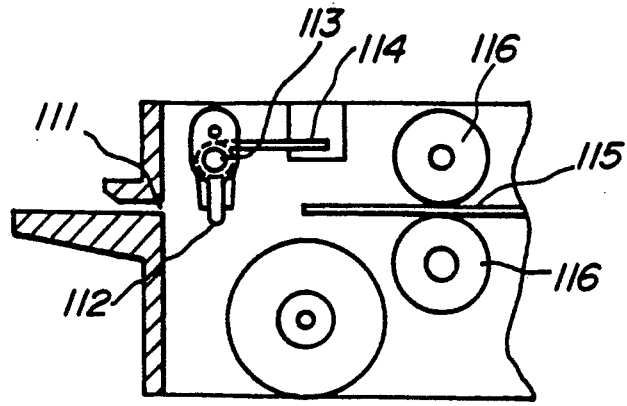
FIGS. 3A, 3B and 3C are cross sectional views depicting another known shutter mechanism.
Figure 3B:
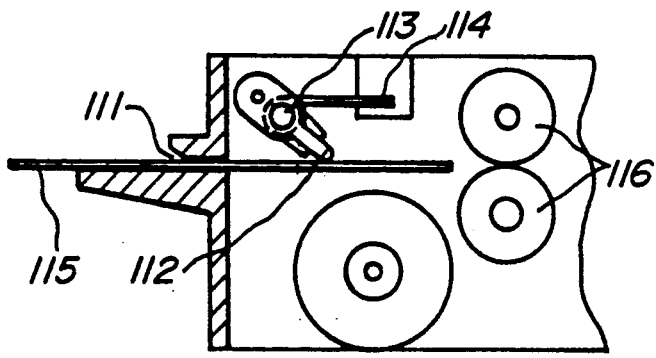
Figure 3C:
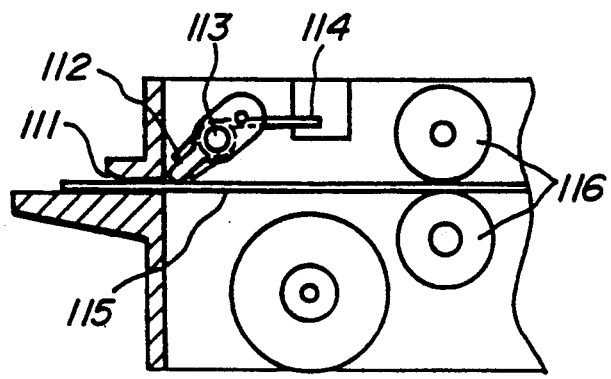

FIG. 4 is a perspective view showing a first embodiment of the shutter mechanism according to the present invention, and FIGS. 5A, 5B, 6A and 6B are schematic side views illustrating the inserting and discharging operations. When a record card 1 such as an optical card is inserted in a forward direction F into a guide slot 13 formed in a front wall of a card recording and/or reproducing apparatus as shown in FIG. 5A, a front edge of the record card 1 is urged against a front surface 2a of a shutter blade 2. Then, the shutter blade 2 is rotated in the counter-clockwise direction in FIG. 5B against the force of springs 4. In this manner, the guide slot 13 is opened and the record card 1 is inserted into the apparatus.

When the front edge of the record card 1 is photoelectrically detected by a detector 5, a motor 6 is energized to rotate card feeding rollers 7. The card feeding rollers 7 are resiliently biased toward clamping rollers 8 by means of leaf springs 9. Therefore, the record card 1 is fed in the forward direction F between the feeding rollers 7 and clamping rollers 8. The record card 1 is then guided between a guide roller 11 and a reference roller 12 such that the position of the record card in a direction parallel to a width of the record card is defined thereby. The guide roller 11 is provided on one end of a lever 10 which is arranged rotatably in a direction shown by an arrow in FIG. 4.

When the record card 1 is to be discharged out of the apparatus, the motor 6 is driven in the reverse direction to rotate the feeding rollers 7 such that the record card is fed in a backward direction B in FIG. 6A. Then, the rear edge of the record card 1 is urged against inclined surfaces 14a of contact members 14 provided on the rear surface of the shutter blade 2. The inclined surfaces 14a of the contact members 14 are set such that the shutter blade 2 is moved upward as shown by an arrow U in FIG. 6B by the engagement of the rear edge of the record card 1 and the inclined surfaces 14a. In this manner, the guide slot 13 is opened and the record card 1 is discharged out of the apparatus.

As explained above, in the shutter mechanism according to the invention, when the record card 1 is inserted into and discharged from the apparatus, the front and rear edges of the record card are made into contact with the front surface 2a of the shutter blade 2 and the inclined surfaces 14a of the contact members 14.

On the front surface 2a of the shutter blade 2 there are integrally formed projections 27. In order to protect the data area of the record card 1, a distance $l_2$ between the projections 27 formed on the front surface 2a of the shutter blade 2 is made wider than a distance $l_1$ of a data area 28 on the record card 1 as shown in FIG. 16. That is to say, the data area 28 of the record card 1 are not made into contact with the shutter mechanism. Similarly, a distance $l_3$ between the contact members 14 provided on the rear surface of the shutter blade 2 is made longer than the distance $l_1$ as illustrated in FIG. 17. In the present embodiment, the record card 1 is made into contact with the projections 27 and contact members 14 provided on the front and rear surfaces of the shutter blade 2, so that the friction caused by the engagement of the record card with the shutter mechanism can be reduced and the record card can be protected.

In the present embodiment, the projections 27 and contact members 14 are made of synthetic resins such as POM (polyacetal resin) and PTFE (polytetrafluoroethylene) having a low coefficient of friction and are secured to a main body of the shutter blade 2 by means of suitable adhesive agent. The shutter blade 2, including such projections and contact members may be formed as a whole by a mold of such plastic materials.

When the record card 1 is deformed or curved, the record card might not be smoothly made to contact the inclined surfaces 14a of the contact members 14. In the present embodiment, in order to avoid such a situation, there is arranged a guide member 15 near the shutter blade 2 as shown in FIG. 4. The guide member 15 includes a base portion and two arm portions 29 which extend in the feeding direction of the record card. As illustrated in FIG. 7 the base portion of the guide member 15 is arranged at a level sufficiently above the feeding path of the record card 1 and the arm portions 29 of the guide member 15 are set at the same level as a top portion of the inclined surfaces 14a of the contact members 14 when the shutter blade 2 is in the closing position. Therefore, the rear end of the record card 1 is guided by the arm portions 29 onto the inclined surfaces 14a of the contact members 14 even if the rear end of the record card is curved upwardly as shown in FIG. 7. In this case, the record card 1 might be damaged by the engagement with the guide member 15. In order to mitigate such a drawback, coatings 16 of synthetic resin may be applied on rear surfaces of the arm portions 29 of the guide member 15 as depicted in FIG. 8A or synthetic resin pads 17 may be adhered onto the rear surfaces of the arm portions 29 of the guide member as shown in FIG. 8B. As illustrated in FIG. 18, a distance $l_4$ between the arm portions 29 is made larger than the width $l_1$ of the data area 28 on the record card 1, so that the data area can be effectively protected against the damage due to the engagement of the record card with the guide member 15.

Now the mechanism for supporting the shutter blade 2 rotatably as well as movably up and down will be explained. As shown in FIG. 4, on opposite sides of the shutter blade 2 are secured first and second shafts 18 and these shafts are inserted into U-shaped grooves 19a formed in first and second supporting members 19. The first and second shafts 18 are resiliently biased downward by means of first and second coiled springs 20 provided between the first and second shafts, respectively and a stationary frame not shown. A coiled spring 4 for rotating the shutter blade 2 in such a direction that the guide slot 13 is closed by the shutter blade is provided around the first shaft 18, and one end of the spring is fixed to the first shaft 18 and the other end of the spring is secured to the first member 19. When the record card 1 is discharged out of the apparatus, the shutter blade 2 is moved upward against the force of the springs 20, while the rotation of the shutter blade is inhibited by the engagement with the inner surface of the front wall of the apparatus. In the present embodiment, the supposing members 19 for supporting the shutter blade 2 are made of plastic material and are secured to a frame, but according to the invention, the supporting members 19 may be formed integrally with a frame 21 by a mold of plastic as illustrated in FIG. 9. Then, the shutter mechanism may be manufactured efficiently.

FIG. 10 is a perspective view showing a second embodiment of the shutter mechanism according to the invention, and FIG. 11 is a side view thereof in an enlarged scale. In the present embodiment, the first and second shafts 18 are inserted into first and second collars 22, respectively and the first and second collars are inserted into the U-shaped recesses 19a formed in the first and second supporting members 19, respectively so that the friction between the shafts 18 and the U-shaped recesses 19a can be reduced. Further, when the record card 1 is discharged from the apparatus, the first and second collars 22 are rotated in the recesses 19a of the first and second supporting members 19, respectively, so that the shutter blade 2 can be moved upward smoothly. In the present embodiment, since the shafts 18 can be freely rotated and moved in the U-shaped recesses 19a of the supporting members 19, the supporting members 19 may be made of any desired material. For instance, the supporting members may be formed by metal plates.

FIG. 12 is a side view showing a third embodiment of the shutter mechanism according to the present invention. In this embodiment, the coiled springs 20 for biasing the shutter blade 2 downward are dispensed with and the guide member 15 is formed to have arms 15a which resiliently press the shafts 18 downward. Then, the number of parts may be reduced.

FIGS. 13A, 13B, 14A and 14B illustrate a fourth embodiment of the shutter mechanism according to the invention. In this embodiment, the coiled springs 4 and 20 for biasing the shafts 18 to rotate and move downward are formed by common springs 24. That is to say, one of the ends of coiled springs 24 is secured to the shutter blade 2 at such a position that the springs substantially enclose the shafts 18. When the record card 1 is inserted into the apparatus, the shutter blade is rotated in the counter-clockwise direction R in FIG. 13B against the force of the springs 24. When the record card 1 is discharged out of the apparatus, the shutter blade 2 is pushed upward U against the force of the springs 24 as depicted in FIG. 14B.

FIG. 15 is a perspective view showing a fifth embodiment of the shutter mechanism according to the invention. In the present embodiment, the shafts 18 secured to the sides of the shutter blade 2 are journaled by an arm-like member 26 which is biased to rotate in the counter-clockwise direction about an axis A by means of a coiled spring 25. When the record card 1 is discharged out of the apparatus, the arm-like member 26 is rotated in the clockwise direction against the force of the spring 25, so that the shutter blade 2 is moved substantially upward. Also in this embodiment, the shafts 18 are biased by the springs 4 to rotate in such a direction that the guide slot is closed by the shutter blade 2.

In the embodiments so far explained, the contact member 14 having the inclined surfaces 14a are provided at both side portions of the shutter blade 2. It has been experimentally confirmed that when the rear edge of the record card 1 is curved to a large extent such that a central portion of the rear edge is higher than side portions of the rear edge, the central portion of the rear edge of the record card is first made to come into contact with the rear surface of the shutter blade 2 before the side portions of the rear edge of the record card are urged against the contact members. Then, there is not produced an effective force for moving the shutter blade 2 upward and the guide slot is not opened. Further, when the record card 1 is inserted into the apparatus, the shutter blade 2 is rotated and tips of the contact members 14 provided on the rear surface of the shutter blade 2 project above a level of the shafts 18. Therefore, it is necessary to provide such a space that the rotation of the shutter blade 2 is not limited by the engagement of the tips of the contact members 14 with any member. This results in that a height of the apparatus is liable to be increased. In embodiments which will be explained hereinbelow, the above mentioned drawbacks can be removed.

FIG. 19 is a perspective view showing a sixth embodiment of the shutter mechanism according to the invention and FIG. 20 is a perspective view illustrating the construction of the shutter blade. In the present embodiment, on the rear surface of the shutter blade 2 are provided three contact members 14 each having the inclined surfaces 14a. That is to say, in addition to first and second contact members 14 provided at opposite sides of the shutter blade 2, there is arranged a third contact member 14 at a central portion of the shutter blade viewed in the direction perpendicular to the feeding direction of the record card 1. As shown in FIG. 20, when the record card 1 is curved such that there is a difference H in the height between the central portion and the side portions, the central portion is first urged against the centrally arranged third contact member 14 upon the discharging the record card out of the apparatus. Then, there is produced a force for pushing the shutter blade 2 upward. After that, the side portions of the record card 1 are made to contact the first and second contact members 14 arranged at the side portions of the shutter blade 2. In this manner, the shutter blade 2 is pushed upward effectively. The remaining construction of the shutter mechanism of the present embodiment is substantially the same as the first embodiment illustrated in FIG. 4. However, the record card feeding mechanism is slightly different from that of the first embodiment. That is to say, in the present embodiment, the motor 6 is secured to a holder 31 and an output shaft of the motor is coupled with a shaft 32 by means of worm gear 33 and worm wheel 34. The shaft 32 is made of strong material such as stainless steel and the driving rollers 7 made of material having a large coefficient of friction and anti-wear property such as Neoprene rubber and EPDM are secured to the shaft 32 by means of cementing or fusing. The shaft 32 is biased by the leaf springs 9 by means of pins 35 made of material having a small coefficient of friction such as polyacetal resin and polytetrafluoroethylene (PTFE) and secured to the lower surfaces of the leaf springs such that the feeding rollers 7 are resiliently urged against the clamping rollers 8. The downward movement of the shaft 32 is limited by a guide 36 and the axial movement of the shaft is restricted by pressing the shaft by a leaf spring 37 toward an end plate 38 constituting a reference surface. It should be noted that the leaf springs 9, guide 36, leaf spring 37 and end plate 38 are all fixed to the frame by means of screws, and the clamping rollers 8 are supported by the frame rotatably. The shaft 32 is supported at its one end by the holder 31 for supporting the motor 6 and the holder 31 is secured to the frame rotatably about an axis M, so that when the motor holder 31 is rotated, the relative position of the worm gear 33 and worm wheel 34 is not changed and thus the shaft 32 is driven stably.

The record card 1 is held between a flange 39 formed integrally with the shaft 32 and a clamping ring 40 which is provided on the shaft movably along the shaft and is biased toward the flange 39 by means of a coiled spring 41. The record card 1 is also clamped between the pressing roller 11 provided on a leaf spring 42 and the reference roller 12. The record card 1 is supported by the feeding rollers 7 and clamping rollers 8 and is further clamped between supporting rollers 43 and pins 45 secured to leaf springs 44. The pins 45 are made of resin materials having a low coefficient of friction such as polyacetal resin and PTFE. The leaf springs 42 and 44 are fixed to a frame member 46 by means of screws and supporting rollers 43 and reference roller 12 are rotatably secured to the frame member 46.

Figure 22A:
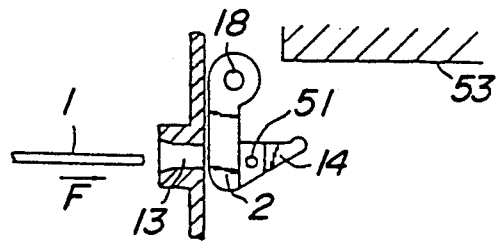
FIGS. 22A, 22B, 23A and 23B are side views for explaining the operation of the contact members of FIG. 21.
Figure 22B:
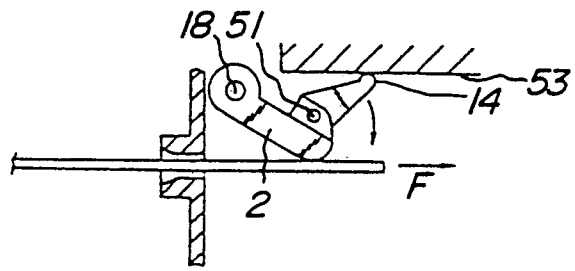
Figure 23A:
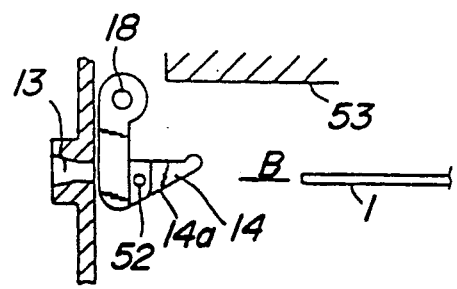
Figure 23B:
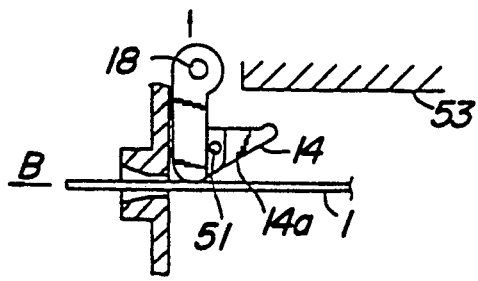

FIG. 21 is a perspective view showing a seventh embodiment of the shutter mechanism according to the invention. In the present embodiment, the contact members 14 are not fixed to the rear surface of the shutter blade 2, but are secured rotatably to the rear surface of the shutter blade. That is to say, the contact members 14 are integrally formed with each other and an integral body of the contact members 14 is rotatably supported by a shaft 51 which is supported by projections 52 secured to the rear surface of the shutter blade 2. The integral body of the contact members 14 can be rotated in the counter-clockwise direction, but could not be rotated in the clockwise direction due to the engagement of the integral body with the rear surface of the shutter blade 2. When the record card 1 is inserted into the apparatus through the guide slot 13 as shown in FIG. 22A and the shutter blade 2 is rotated about the shaft 18 as illustrated in FIG. 22B, the tips of the contact members 14 are urged against a stationary member 53. Then, the contact members 14 are rotated in the counter-clockwise direction about the shaft 51 relative to the shutter blade 2. Therefore, the shutter blade 2 can be further rotated in the clockwise direction. In this manner, the guide slot 13 is opened and the record card 1 can be inserted into the apparatus. When the record card 1 is discharged from the apparatus, the rear edge of the record card is urged against the inclined surfaces 14a of the contact members 14, but since the contact members 14 could not be rotated in the counter-clockwise direction with respect to the shutter blade 2, there is produced the force for moving the shutter blade 2 upward as shown in FIGS. 23A and 23B.

FIGS. 24 and 25 show an eighth embodiment of the shutter mechanism according to the invention. In this embodiment, in addition to the contact members 14 provided at the opposite side portions of the shutter blade 2, there are provided two contact members 14 at central portion of the shutter blade and a roller 55 is arranged between these contact members 14. The integral body of the contact members 14 and roller 55 are rotatably supported by the shaft 51. By providing the roller 55 the damage of the record cord 1 can be further reduced.

As explained above, in the shutter mechanism according to the invention, the shutter blade is rotated in the forward direction when the record card is inserted into the apparatus and the shutter blade is moved upward when the record card is discharged from the apparatus. As a result, the guide slot can be opened stably by a small force, so that the deformation and damage of the record card can be effectively avoided without providing an expensive electromagnetic actuator. Moreover, even if the record card is curved, the record card can be effectively discharged out of the apparatus. Further, in the closed position of the shutter blade, the guide slot is completely closed by the shutter blade, so that dust particles cannot be introduced into the apparatus.

The contact members have inclined surfaces against which the rear edge of the record card is urged when the card is discharged from the apparatus, and the shutter blade can be positively moved upward by the backward movement of the record card. In this case, the contact members are provided not only at the side portions of the shutter blade, but also at the central portion, so that the shutter blade can be moved upwardly even if a curved record card is used. Moreover, in the shutter mechanism according to the invention, the shutter blade is rotated only in the forward direction from the neutral position, and the space near the shutter blade can be reduced. In the embodiments in which the contact members are rotatably secured to the rear surface of the shutter blade, the height of the space can be decreased. In this manner, the shutter mechanism according to the invention can be made small in size, simple in construction and inexpensive.

What is claimed is:

1. A shutter mechanism for use in a recording and/or reproducing apparatus having a guide slot through which a card-like record medium is to be inserted into and discharged from the apparatus, said mechanism comprising:

a shutter blade for being positioned behind the guide slot of the apparatus;

contact means arranged on a rear surface of the shutter blade and having at least one inclined contact surface against which a rear edge of the card-like record medium is urged when the card-like record medium is to be discharged from the apparatus to produce a force for moving the shutter blade upward to open the guide slot;

first and second shafts each secured to respective sides of the shutter blade;

supporting members supporting said first and second shafts rotatably as well as movably substantially up and down; and biasing means resiliently urging said shutter blade to rotate about longitudinal axes of said first and second shafts in such a direction that the guide slot is closed by the shutter blade and resiliently urging said shutter blade downward so as to close the guide slot.

2. A shutter mechanism according to claim 1, wherein said contact means comprises first and second contact members provided on the rear surface of the shutter blade at its opposite side portions, each of said contact members having an inclined surface against which the rear edge of the card-like record medium is urged when the card-like record medium is discharged from the apparatus.

3. A shutter mechanism according to claim 2, wherein said contact means further comprises a shaft secured to the rear surface of the shutter blade, and said first and second contact members are secured to said shaft rotatably in an opposite direction to that in which said shutter blade is rotated when the card-like record medium is inserted into the apparatus.

4. A shutter mechanism according to claim 1, wherein said contact means comprises first and second contact members provided on the rear surface of the shutter blade at its opposite side portions, respectively, and at least one third contact member provided on the rear surface of the shutter blade at a central portion thereof, each of said contact members having an inclined surface against which the rear edge of the card-like record medium is urged when the card-like record medium is discharged from the apparatus.

5. A shutter mechanism according to claim 4, wherein said contact means further comprises a shaft secured to the rear surface of the shutter blade, and said first, second and third contact members are secured to said shaft rotatably in direction opposite to that in which said shutter blade is rotated when the card-like record medium is inserted into the apparatus.

6. A shutter mechanism according to claim 5, wherein said contact means further comprises two third contact members provided at the central portion of the rear surface of the shutter blade and a roller arranged between said two third contact members and secured rotatably to said shaft.

7. A shutter mechanism according to claim 1, wherein said supporting means comprises first and second supporting members having U-shaped recesses into which said first and second shafts, respectively, are disposed so as to be rotatable and movable up and down.

8. A shutter mechanism according to claim 7, wherein said supporting members are attached to a frame, and said biasing means comprises (i) a first coiled spring wound around one of said first and second shafts and arranged between said shutter blade and the first and second supporting members, respectively, urging the shutter blade to rotate about said longitudinal axes of the first and second shafts in such a direction that the guide slot is closed by the shutter blade, and (ii) second and third coiled springs arranged between the first and second shafts, respectively, and said frame so as to pull the shutter blade downward to close the guide slot.

9. A shutter mechanism according to claim 8, wherein said first and second supporting members are integral with said frame.

10. A shutter mechanism according to claim 7, wherein said supporting means further comprises first and second collars arranged around the first and second shafts, respectively, in a rotatably manner and said first and second collars are at least partially disposed in the U-shaped recesses of the first and second supporting members, respectively, so as to be rotatable and movable up and down.

11. A shutter mechanism according to claim 7, wherein said support members are attached to a frame, and said biasing means comprises first and second coiled springs arranged between the shutter blade and said frame such that the first and second shafts are substantially enclosed by the first and second coiled springs, respectively.

12. A shutter mechanism according to claim 1, wherein said supporting means comprises an arm member having first and second arms to which said first and second shafts are rotatably secured, respectively, and said biasing means comprises a first coiled spring wound around one of said first and second shafts and at least one second coiled spring arranged between the arm member and a frame.

13. A shutter mechanism according to claim 1, further comprising a guide member arranged behind the shutter blade and having a base portion arranged above a feeding path of the card-like record medium and first and second arm portions which are arranged at substantially a same level as tips of the inclined surfaces and which are caused to contact an upper surface of the card-like record medium when the record medium is discharged from the apparatus.

14. A shutter mechanism according to claim 13, wherein said guide member comprises a resilient material.

15. A shutter mechanism according to claim 14, wherein said biasing means comprises a coiled spring wound around one of the first and second shafts and first and second arms integral with the first and second arm portions of the guide member, said first and second arms being urged against the first and second shafts such that the shutter blade is pressed downward.

16. A shutter mechanism according to claim 13, wherein on lower surfaces of said arm portions are provided sliding members made of material having a low coefficient of friction.

17. A shutter mechanism according to claim 16, wherein said sliding members are made of a material selected from the group consisting of polyacetal resin and polytetrafluoroethylene.

18. A shutter mechanism according to claim 13, wherein a distance between said first and second arm portions of the guide member viewed in a direction perpendicular to a direction in which the card-like record medium is to be inserted into the apparatus is greater than a width of a data area of the card-like record medium.

19. A shutter mechanism according to claim 1, wherein said shutter blade has first and second projections on a front surface of the shutter blade, said first and second projections being made into contact with a front edge of the card-like record medium when the record medium is inserted into the apparatus.

20. A shutter mechanism according to claim 19, wherein a distance between said first and second projections viewed in a direction perpendicular to a direction into which the card-like record medium is to be inserted into the apparatus is greater than a width of a data area on the card-like record medium.

21. A shutter mechanism according to claim 1, wherein said contact means comprises first and second contact members provided on the rear surface of the shutter blade at its opposite side portions, each of said contact members having an inclined surface against which the rear edge of the card-like record medium is urged when the card-like record medium is discharged from the apparatus, and a distance between said first and second contact members is greater than a width of a data area on the card-like record medium.

* * * * *